(12) United States Patent
Rajan et al.

(10) Patent No.: US 8,638,219 B2
(45) Date of Patent: Jan. 28, 2014

(54) DEVICE AND METHODS OF PROVIDING RADIO DATA SYSTEM INFORMATION ALERTS

(75) Inventors: Rajeev D. Rajan, San Diego, CA (US); Jatin Kadakia, San Diego, CA (US); Jason Miller, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 428 days.

(21) Appl. No.: 12/140,059

(22) Filed: Jun. 16, 2008

(65) Prior Publication Data

US 2009/0045951 A1  Feb. 19, 2009

Related U.S. Application Data

(60) Provisional application No. 60/944,719, filed on Jun. 18, 2007.

(51) Int. Cl.
*G08B 1/08* (2006.01)

(52) U.S. Cl.
USPC ............. 340/539.11; 340/901; 340/539.26

(58) Field of Classification Search
USPC ......... 340/539.11, 901, 905, 904, 902, 539.1, 340/539.13, 539.19, 539.21, 539.22, 539.26
See application file for complete search history.

(56) References Cited

U.S. PATENT DOCUMENTS

| | | | |
|---|---|---|---|
| 5,214,792 A * | 5/1993 | Alwadish | 455/45 |
| 5,239,681 A | 8/1993 | Parnall et al. | |
| 5,465,088 A | 11/1995 | Braegas | |
| 5,661,811 A | 8/1997 | Huemann et al. | |
| 5,907,793 A | 5/1999 | Reams | |
| 5,949,492 A * | 9/1999 | Mankovitz | 348/473 |
| 6,173,165 B1 | 1/2001 | Ruhl et al. | |
| 6,332,120 B1 * | 12/2001 | Warren | 704/235 |
| 6,530,082 B1 | 3/2003 | Del Sesto et al. | |
| 6,975,835 B1 | 12/2005 | Lake et al. | |
| 7,231,176 B2 * | 6/2007 | Levy | 455/3.01 |
| 2001/0025376 A1 | 9/2001 | Knobl | |
| 2003/0054804 A1 | 3/2003 | Brandes et al. | |
| 2003/0119441 A1 | 6/2003 | Simons et al. | |

(Continued)

FOREIGN PATENT DOCUMENTS

| | | |
|---|---|---|
| CN | 1241093 A | 1/2000 |
| CN | 1507186 | 6/2004 |

(Continued)

OTHER PUBLICATIONS

Davies P: "The radio system-traffic channel" Vehicle Navigation and Information.Systems Conference, 1989. Conferenc E Record Toronto, Ont., Canada Sep. 11-13, 1989, New York, NY, USA,IEEE, US, Sep. 11, 1989, pp. A44-A48, XP010034419.

(Continued)

*Primary Examiner* — Daniel Previl
(74) *Attorney, Agent, or Firm* — Abdollah Katbab

(57) ABSTRACT

Devices and methods of generating an alert comprise receiving a broadcast radio transmission at a communication device, wherein the broadcast radio transmission comprises primary content and supplemental content having a relationship to the primary content. Further, the primary content comprises a first audio data, and the supplemental content comprises a non-audio data. The devices and methods further include detecting the receiving of the supplemental content, and generating an alert signal operable to activate an alerting device to output a non-visual notification.

48 Claims, 5 Drawing Sheets

(56) References Cited

U.S. PATENT DOCUMENTS

| | | |
|---|---|---|
| 2004/0110522 A1 | 6/2004 | Howard et al. |
| 2004/0176061 A1 | 9/2004 | Zehnle et al. |
| 2004/0198279 A1* | 10/2004 | Anttila et al. ............ 455/179.1 |
| 2005/0020223 A1 | 1/2005 | Ellis et al. |
| 2005/0054286 A1 | 3/2005 | Kanjilal et al. |
| 2005/0086702 A1 | 4/2005 | Cormack et al. |
| 2005/0181838 A1* | 8/2005 | Matsuda et al. ............ 455/567 |
| 2005/0249139 A1* | 11/2005 | Nesbit ............................ 370/312 |
| 2005/0271219 A1 | 12/2005 | Bruelle-Drews |
| 2005/0287972 A1 | 12/2005 | Christensen et al. |
| 2006/0045285 A1 | 3/2006 | Bremermann |
| 2006/0083388 A1 | 4/2006 | Rothschild |
| 2006/0128418 A1 | 6/2006 | Quelle et al. |
| 2006/0197753 A1* | 9/2006 | Hotelling ...................... 345/173 |
| 2006/0264171 A1* | 11/2006 | Kwon et al. ................. 455/3.01 |
| 2006/0268763 A1 | 11/2006 | George |
| 2007/0010221 A1 | 1/2007 | Howard et al. |
| 2007/0116297 A1 | 5/2007 | Mishra |
| 2007/0143218 A1 | 6/2007 | Vasa |
| 2007/0196802 A1* | 8/2007 | Beletski et al. ............... 434/323 |
| 2007/0248055 A1 | 10/2007 | Jain et al. |
| 2007/0250597 A1 | 10/2007 | Resner et al. |
| 2008/0036653 A1* | 2/2008 | Huston .................... 342/357.07 |
| 2008/0212785 A1 | 9/2008 | Ullmann |
| 2008/0313697 A1 | 12/2008 | Rajan et al. |

FOREIGN PATENT DOCUMENTS

| | | |
|---|---|---|
| CN | 1647551 A | 7/2005 |
| CN | 1701520 A | 11/2005 |
| CN | 1702605 A | 11/2005 |
| EP | 0283708 A2 | 9/1988 |
| EP | 0967748 A2 | 12/1999 |
| EP | 0977389 A2 | 2/2000 |
| EP | 1434371 A2 | 6/2004 |
| JP | 6334548 A | 12/1994 |
| JP | 8179793 A | 7/1996 |
| JP | 8279796 A | 10/1996 |
| JP | 8339490 A | 12/1996 |
| JP | 9051511 A | 2/1997 |
| JP | 9205379 | 8/1997 |
| JP | 10502499 T | 3/1998 |
| JP | 10256927 A | 9/1998 |
| JP | 10327112 A | 12/1998 |
| JP | 11355229 | 12/1999 |
| JP | 2004509509 A | 3/2004 |
| JP | 2004364245 A | 12/2004 |
| JP | 2006094326 A | 4/2006 |
| JP | 2006101561 A | 4/2006 |
| JP | 2006512022 T | 4/2006 |
| JP | 2007025930 A | 2/2007 |
| KR | 20000049405 A | 8/2000 |
| KR | 1020020000563 A | 1/2002 |
| KR | 20030090826 A | 12/2003 |
| KR | 1020050026937 | 3/2005 |
| KR | 1020050039536 | 4/2005 |
| WO | WO0223773 | 3/2002 |
| WO | WO02093400 A1 | 11/2002 |
| WO | WO2004068730 A1 | 8/2004 |
| WO | WO2005068494 | 7/2005 |
| WO | WO2007032759 A1 | 3/2007 |

OTHER PUBLICATIONS

De Groot M T: "Rhine-Corridor An RDS-TMC Pilot for Radio Traffic Information" 19920902; 19920902-19920904, Sep. 2, 1992, pp. 8-13, XP010259475.

Herbert M: "The Road Traffic Advisor project" 19990303, Mar. 3, 1999, pp. 7/1-713, XP006500626.

International Search Report and Written Opinion—PCT/US2008/067235, International Search Authority—European Patent Office—Feb. 16, 2009.

Sammo Cho et al: "System and Services of Terrestrial Digital Multimedia Broadcasting (T-DMB)" IEEE Transactions on Broadcasting, IEEE Service Center, Piscataway, NJ, US, vol . 53, No. 1, Mar. 1, 2007, pp. 171-178, XP011172014.

Van Coile B et al: "Speech synthesis for the new Pan-European traffic message control system RDS-TMC" Speech Communication, Elsevier Science Publishers, Amsterdam, NL, vol. 23, No. 4, Dec. 1, 1997, pp. 307-317, XP004117221.

Nokia Press Release, "Kiss FM Begins Visua lRadio Broadcasts," Mar. 4, 2005.

RDS Forum 2005, R05036_1, "Radio text plus (RTplus) Specification," Version1.0, Jun. 13, 2005.

R.V. R. Elettronica SpA., "WINRDS User Manual", Version 1.0, Oct. 7, 2003.

T. Ogawa et al., "LSI for RDS broadcasting, multiplex of digital data to FM signal." Nikkei Electronics. Aug. 24, 1987, No. 428. pp. 201-217.

U.S. RBDS Standard, "Specification of the radio broadcast data system (RBDS)", National Association of Broadcasters, Apr. 9, 1998, pp. 2-204.

Wright, Scott, "RBDS versus RDS—What are the differences and how can receivers cope with both systems" National Radio Systems Committee, Jan. 1998, pp. 2-11.

Taiwan Search Report—TW097122753—TIPO—Feb. 3, 2012.

* cited by examiner

DEVICE AND METHODS OF PROVIDING RADIO DATA SYSTEM INFORMATION ALERTS

CLAIM OF PRIORITY UNDER 35 U.S.C. §119

The present Application for Patent claims priority to Provisional Application No. 60/944,719 entitled "APPARATUS AND METHODS FOR PROVIDING AM/FM—RADIO DATA SYSTEM (RDS) BASED TECHNOLOGIES" filed Jun. 18, 2007, and assigned to the assignee hereof and hereby expressly incorporated by reference herein.

REFERENCE TO CO-PENDING APPLICATIONS FOR PATENT

The present application for patent is related to the following co-pending U.S. patent application:

"TAGGING LANGUAGE FOR BROADCAST RADIO," having application Ser. No. 11/738,241 filed Apr. 20, 2007, assigned to the assignee hereof, and expressly incorporated by reference herein.

BACKGROUND

1. Field

The described aspects relate generally to broadcast radio usage in a receiver. More particularly, the described aspects relate to alerts of received information from a radio broadcast.

2. Background

Broadcast radio stations, such FM radio stations, may use a system known as a Radio Data System (RDS) or Radio Broadcast Data System (RBDS), both referred to herein as "RDS," to transmit supplemental information corresponding to their normal radio programming, e.g. music, talk, news, etc. RDS provides a standard protocol for several types of supplemental information transmitted by the broadcast radio stations, such as the identity of the particular radio station, the type of programming, and text information such as the name of an artist and/or song.

For example, broadcast radio stations transmit their programming and the supplemental information in the RDS format as distinct signals multiplexed onto a single carrier. Radio receivers having RDS decoders, such as those included with some wireless communications devices or those in a vehicle, permit a user to listen to the transmitted programming and view the corresponding supplemental information on a display.

Some new specifications and services have been developed that build on or work in conjunction with radio programming comprising RDS. For example, some specifications provide additional messages that can control portions of the supplemental information, such as the display of the radio text information. In another example, some services have been developed to provide content to the receiver using a data connection, where the content is synchronized with the radio programming via the RDS data.

In any case, despite the enhanced user experience potentially provided by RDS information, current RDS-enabled communication devices have limitations in enabling a user to perceive the RDS information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In general, the described device and methods enable a user to be notified when RDS-type supplemental content is received by a communication device via a broadcast radio signal, and optionally to control the receipt and notification functionality according to user-defined criterion.

In one aspect, a method of generating an alert comprises receiving a broadcast radio transmission at a communication device, wherein the broadcast radio transmission comprises primary content and supplemental content having a relationship to the primary content. Also, the primary content comprises a first audio data, and the supplemental content comprises a non-audio data. Further, the method includes detecting the receiving of the supplemental content. Additionally, the method includes generating an alert signal operable to activate an alerting device to output a non-visual notification.

In some optional aspects, the method further includes comparing at least a portion of the supplemental content with at least a portion of one or more user-defined criterion to determine if a match exists, wherein generating the alert signal is responsive to the comparing identifying existence of the match.

In yet other optional aspects, the method further includes activating, prior to the receiving, an idle mode operable to inactivate an outputting on the communication device of any received primary content and any received supplemental content, and comparing at least a portion of the received supplemental content with at least a portion of one or more user-defined criterion to determine if a match exists, wherein generating the alert signal is responsive to the comparing identifying existence of the match.

In another aspect, a computer program product for generating an alert comprises a computer-readable medium including instructions for a computer. The instructions include at least one instruction operable to cause a computer to receive a broadcast radio transmission at a communication device, wherein the broadcast radio transmission comprises primary content and supplemental content having a relationship to the primary content. Also, in this aspect, the primary content comprises a first audio data, wherein the supplemental content comprises a non-audio data. Further, the instructions include at least one instruction operable to cause the computer to detect the receiving of the supplemental content. Additionally, the instructions include at least one instruction operable to cause the computer to generate an alert signal operable to activate an alerting device to output a non-visual notification.

In some optional aspects of the computer program product, the computer-readable medium further comprises at least one instruction operable to cause the computer to activate, prior to the receiving, an idle mode operable to block an outputting on the communication device of any received primary content and any received supplemental content. Additionally, in this aspect, the computer-readable medium further comprises at least one instruction operable to cause the computer to compare at least a portion of the received supplemental content with at least a portion of one or more user-defined criterion to determine if a match exists, wherein the at least one instruction operable to cause the computer to generate the alert signal is responsive to the at least one instruction operable to cause the computer to compare identifying existence of the match.

In still another aspect, at least one processor for generating an alert comprises a first module for receiving a broadcast radio transmission at a communication device. The broadcast radio transmission comprises primary content and supplemental content having a relationship to the primary content, wherein the primary content comprises a first audio data, and wherein the supplemental content comprises a non-audio data. Further, the at least one processor includes a second module for detecting the receiving of the supplemental content. Additionally, the at least one processor includes a third module for generating an alert signal operable to activate an alerting device to output a non-visual notification.

In some optional aspects, the at least one processor further comprises a fourth module for activating, prior to the receiving, an idle mode operable to block an outputting on the communication device of any received primary content and any received supplemental content. Additionally, the at least one processor further comprises a fifth module for comparing at least a portion of the received supplemental content with at least a portion of one or more user-defined criterion to determine if a match exist, wherein the third module for generating the alert signal is responsive to the fifth module for comparing identifying existence of the match.

In a further aspect, a communication device for generating an alert comprises means for receiving a broadcast radio transmission, wherein the broadcast radio transmission comprises primary content and supplemental content having a relationship to the primary content, wherein the primary content comprises a first audio data, and wherein the supplemental content comprises a non-audio data. Further, the communication device includes means for detecting the receiving of the supplemental content. Additionally, the communication device includes means for generating an alert signal operable to activate an alerting device to output a non-visual notification.

In an optional aspect, the communication device further comprises means for activating, prior to the receiving, an idle mode operable to block an outputting on the communication device of any received primary content and any received supplemental content. Additionally, the communication device includes means for comparing at least a portion of the received supplemental content with at least a portion of one or more user-defined criterion to determine if a match exists, wherein the means for generating the alert signal is responsive to the means for comparing identifying existence of the match.

In yet another aspect, a communication device for generating an alert comprises a receiver operable to receive a broadcast radio transmission, wherein the broadcast radio transmission comprises primary content and supplemental content having a relationship to the primary content, wherein the primary content comprises a first audio data, and wherein the supplemental content comprises a non-audio data. Further, the communication device includes a detector operable to detect the receiving of the supplemental content. Additionally, the communication device includes a generator operable to generate an alert signal operable to activate an alerting device to output a non-visual notification.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
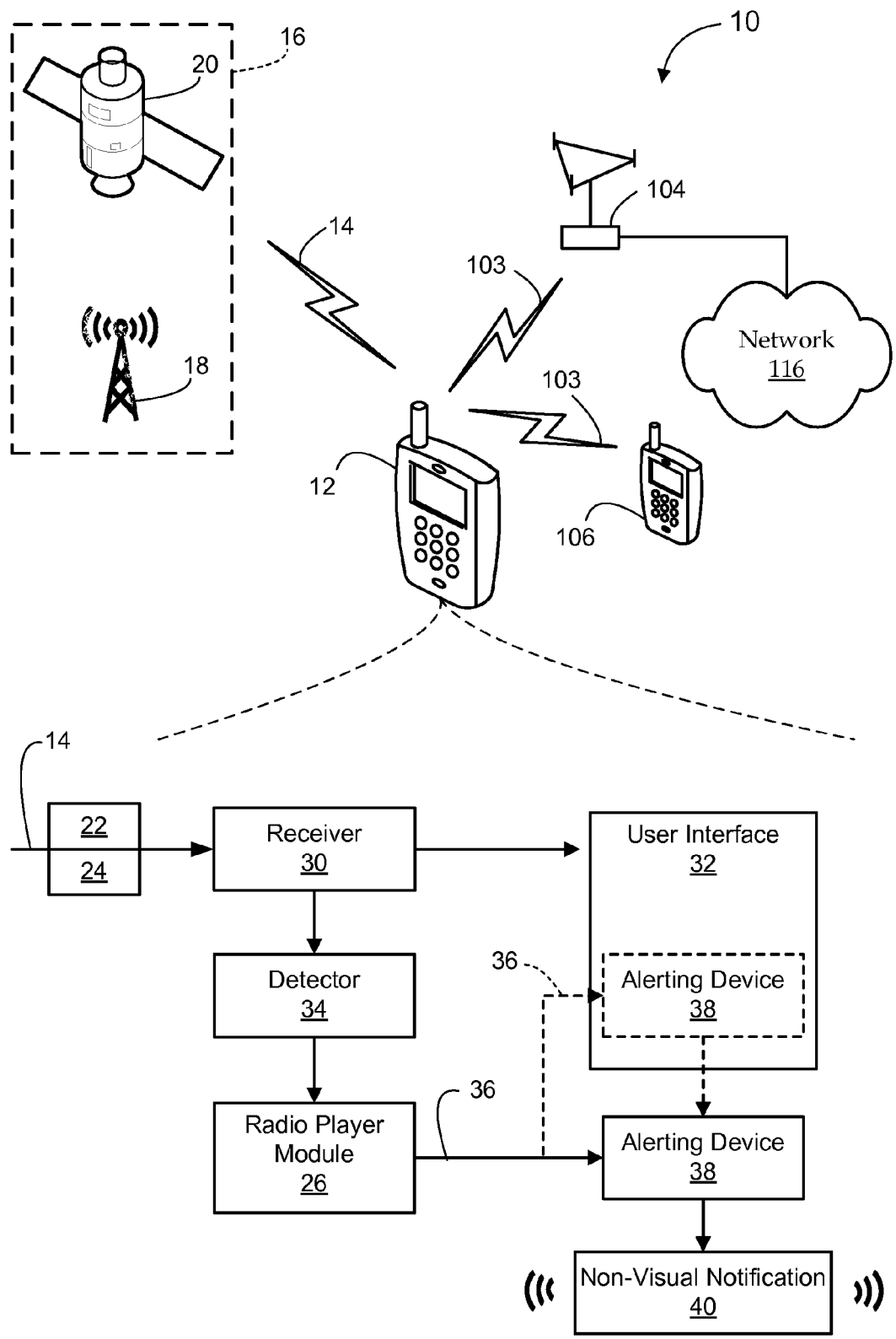
FIG. 1 is a schematic diagram of one aspect of a system of providing an alert of received supplemental content, including relevant components of a communication device.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an"

as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, in one aspect, a system 10 for providing alerts includes a communication device 12 operable to receive a broadcast radio transmission 14 from a broadcast radio network 16 and output data carried by the transmission 14 for consumption of a user of communication device 12. In particular, communication device 12 is configured to generate an alert signal based on data received in broadcast radio transmission 14. The alert signal may cause an alert or notification to be generated on the communication device, and/or the communication may transmit the alert signal to one or more other communication device, such as a remotely-located device, operable to generate the alert or notification.

Broadcast radio network 16 may include one or more transmitters of radio programming, such as a terrestrial-based station 18 and/or a satellite-based station 20. Further, broadcast radio transmission 14 includes one or more carrier waves carrying primary content 22 and supplemental content 24, which has a relationship to the respective primary content 22. For example, primary content 22 may include radio programming in the form of music, talkshows, news, and/or any other audio data. On the other hand, supplemental content 24 may include non-audio data, such as text, graphics, images, video, etc. Moreover, supplemental content 24 may have one or any combination of the following relationships to primary content 22: an output time relationship, e.g. to insure outputting of the respective data on communication device at a certain time relative to one another; a descriptive relationship, e.g. supplemental content 24 may be data describing primary content 22 and/or information related to or associated with primary content 22; and an advertising relationship, e.g. supplemental content 24 may comprise an advertisement related to primary content 22, and/or an advertisement targeted to a user of communication device 12, and/or a general advertisement.

In one use case, for example, broadcast radio transmission 14 may include a radio broadcast according to a Radio Data System (RDS) standard or a Radio Broadcast Data System (RBDS) standard, both hereinafter referred to as RDS. Based on the RDS standard, transmission 14 includes audio radio programming, referred to herein as primary content 22, and extra digital information, such as a name, call letters or frequency of the radio station, artist and track name, etc., referred to herein as supplemental information 24. As mentioned above, the extra digital information or supplemental content 24 may be in a variety of formats, but generally includes non-audio data such as text data. In any case, a properly configured radio receiver and output mechanisms can generate audible sounds representing the radio programming and display text, images, graphics, etc., representing the extra digital information, thereby enhancing the radio listening experience of a user.

As such, communication device 12 includes a receiver 30 for receiving broadcast radio transmission 14 and transforming it into information for use by communication device 12. In one particular aspect, receiver 30 is configured with RDS decoding capabilities that allow receiver 30 to parse primary content 22 and supplemental content 24, and forward these respective components for rendering by one or more output mechanisms of a user interface 32, such as a speaker and a display.

Further, communication device 12 includes a radio player module 26 operable to communicate with receiver 30 and to control an output of primary content 22 and/or supplemental content 24 on user interface 32. In particular, radio player module 26 may include one or any combination of hardware, software, firmware, algorithms, interactive menus, etc., that allow a user to manage operation of the radio functionality of communication device 12.

Although a user of communication device 12 may be executing radio player module 26 to listen to an audible representation of primary content 22, the user may not always be able to watch a display on communication device 12 to view a representation of supplemental content 24. For example, such a situation may occur if the user is not looking at communication device 12, or if the user has placed the device in a pocket or in another remote location where display is not readily viewable. As such, in one aspect, radio player module 26 includes or communicates with a detector module 34 operable to identify an existence of supplemental content 24 received by receiver 30. In one aspect, for example, upon identification of received supplemental content 24 by detector 34, radio player module 26 is operable to generate an alert signal 36 that is operative to activate an alerting device 38 to output a non-visual notification 40. Alerting device 38 may include one or any combination of hardware, software, instructions, alert generating algorithms, etc., operable to generate an output comprising non-visual notification 40. Non-visual notification 40 enables communication device 12 to advise a user of the presence of supplemental content 24 using a mechanism likely to get the attention of the user, so as to improve the chances that the user does not miss viewing a representation of supplemental content 24 on a display.

For example, non-visual notification 40 may include, but is not limited to, one or any combination of an audible sound notification or a haptic notification. For example, an audible sound notification includes but not limited to a tone, an alarm, a music clip, a speech clip, sound generated by a vibration, and a text-to-speech translated message based on at least a portion of supplemental content 24 or other text stored on communication device 12. Also, for example, a haptic notification includes but not limited to a vibration.

Additionally, it should be noted that, in some aspects, the audible sound notification is distinguishable relative to the audible sound representing the primary content 22. Further, in some aspects, the audible sound notification may be injected into the outputting of the audible sound representing the primary content 22, such as by replacing a portion of the audible sound representing the primary content 22, or by being combined with a portion of the audible sound representing the primary content 22. Also, the phrase "injected into the outputting of the audible sound representing the primary content 22" may mean added to the same output signal, channel, or device, or added to a different output signal, channel, or device, where the signal, channel, or device may include but is not limited to, for example, a left side and a right side. For example, there may be different left side and right side speakers built into or connected to communication device 12. Additionally, in any of the above-noted aspects, the audible sound notification may be configured to be output at a relatively higher volume than the audible sound representing the primary content 22.

Moreover, it should be also noted that alerting device 38 may be a component of or connected to communication device 12, or alerting device 38 may be remote from communication device 12. For example, alerting device 38 may be another device likely to be in an area nearby the user, where alerting device 38 is configured to output non-visual notification 40 upon receipt of alert signal 36. For example, alerting device 38 may be another device in the user's personal area network, and/or another device in communication over a wide area network. As such, in one aspect, communication device 12 initially receiving and detecting supplemental content 24 may be a relay device or a gateway, transmitting alert signal 36 to a different device.

For example, communication device 12 may be a wireless telephone, and may transmit alert signal 36 to a landline phone, and/or a television, and/or a pager, etc. On the other hand, communication device 12 may be a television or desktop computer, and may transmit alert signal 36 to a wireless telephone. And, as noted above, communication device 12 may be operable to transmit alert signal 36 to more than one alerting device 38.

Additionally, it should be noted that communication device 12 may be operable to generate and/or transmit more than one alerting signal 36 per detected or matched supplemental content 24, and communication device 12 and/or alerting device 38 may be operable to output more than one non-visual notification 40 per detected or matched supplemental content 24. For example, a series of alert signals 36 and/or non-visual notifications 40 may be generated over a given time period.

Figure 2:
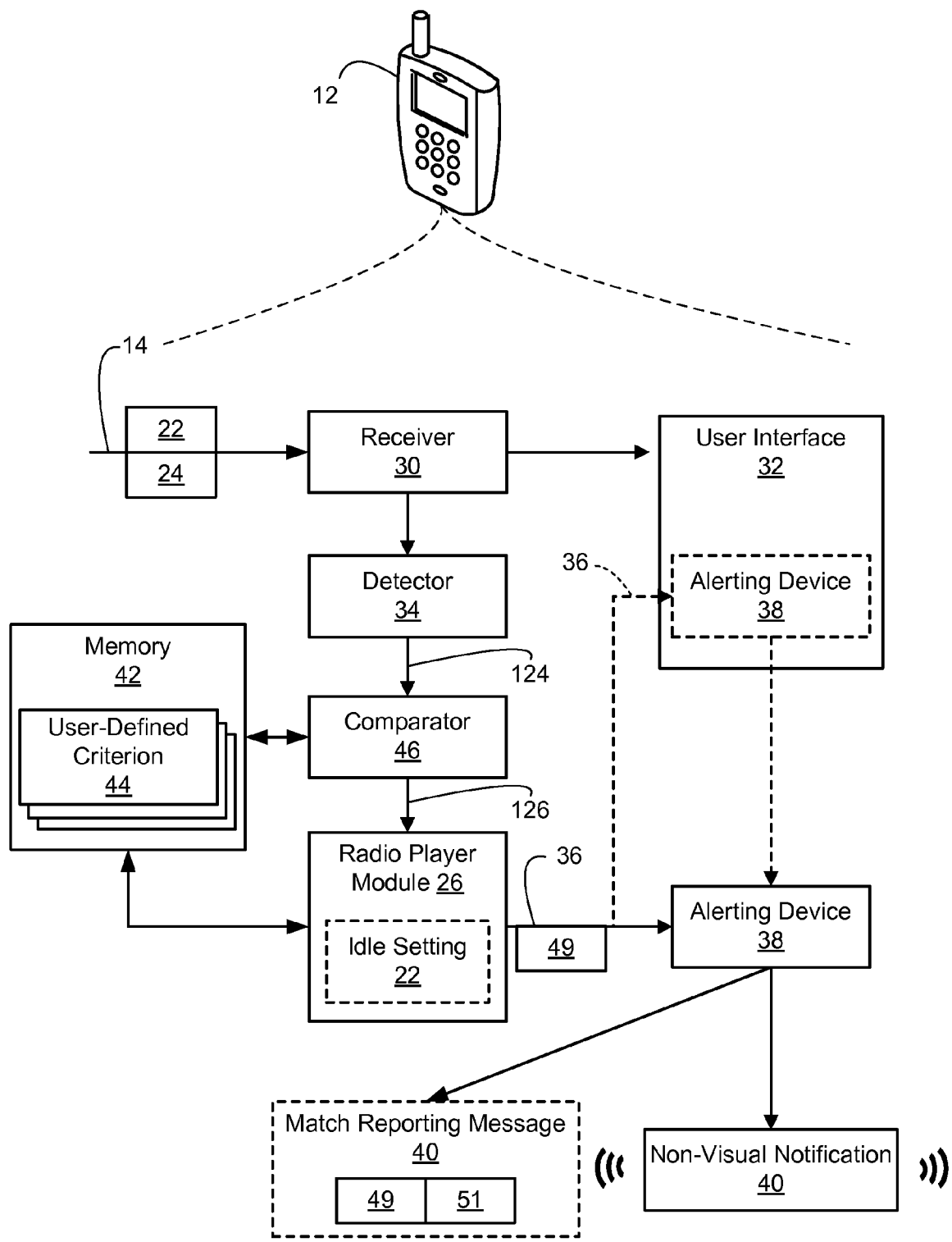
FIG. 2 is a schematic diagram of an aspect of the communication device of FIG. 1.

Referring to FIG. 2, in another aspect, communication device 12 includes additional components that operate to provide user control over the generation of alert signal 36 and/or the outputting of non-visual notification 40. In particular, in one aspect, communication device 12 includes a memory 42 operable to store, among other things, one or more user-defined criterion 44 for use in determining whether or not alert signal 36 and/or non-visual notification 40 are generated.

For example, user-defined criterion 44 may include, but is not limited to, one or any combination of data such as: a letter, a number, a symbol, a word, a phrase, or at least any portion of text data. In an example of a use case, user-defined criterion 44 may relate to a type of primary content 22 in which the user is interested, such as the name of an artist or band, a type of music or programming (e.g. rock, country, news, talk, etc.), the name of a specific radio program, the name of a deejay, etc. In another example of a use case, user-defined criterion 44 may be a time of day and/or a date. In another example of a use case, user-defined criterion 44 may be one or more radio station names, slogans, call letters or frequencies. It should be noted that each of the above use cases may be combined with one or more of each other to define a new use case.

As such, in this aspect, communication device 12 may additionally include a comparator 46 operable to compare at least a portion of supplemental content 24 to one or more user-defined criterion 44 to determine if a match exists. Responsive to identification of existence of a match, radio player module 26 is then operable to generate alert signal 36, e.g. for local or remote use, and/or to output non-visual notification 40, both in the same manner as described above.

In a further aspect, radio player module 26 may have a mode setting 48 that defines an operational capability of the radio functionality. For example, mode setting 48 may include an "interactive" or "on" mode, which corresponds to a full functionality of radio player module 26. In the interactive or on mode, radio player module 26 is enabled to output representations of primary content 22 and supplemental content 24 on one or more output devices of user interface 32, as well as manage interactions with the user, for example to change/set radio stations, to change/set volume settings, to respond to supplemental content 24, etc.

In contrast, mode setting 48 may also include an "idle" or "power saving" mode, which corresponds to a limited functionality of radio player module 26. In the idle or power saving mode, in one aspect, radio player module 26 communicates with receiver 30 to enable receiving of broadcast radio signal 14 or primary content 22 and supplemental content 24, however, the particular signal 14 and/or the particular content 22 and 24 may be limited, and the outputting of signals and/or representations corresponding to the respective content 22 and 24 may also be limited. For example, in idle mode, radio player module 26 may only tune the radio to a given frequency, for example, based on user settings. Further, for example, in idle mode, radio player module 26 may allow processing of only certain content 22 and 24, again, for example, based on user settings.

As such, in this aspect, the user may utilize mode setting 48 as another factor in determining whether or not to have radio player module 26 initiate generation of alert signal 36 and/or non-visual notification 40. In particular, when mode setting 48 comprises idle mode, the receiving of broadcast radio signal 14, and hence primary content 22 and supplemental content 24, and/or the outputting of representations of content 22 and 24 on device 12, may be based on one or more user-defined criterion 44. Typically, for example, in idle mode, generation of alert signal 36 and/or non-visual notification 40 may be based on a combination of receiving one or more radio station names, slogans, call letters, or frequencies, as defined by user-defined criterion 44, along with determining a match between at least a portion of supplemental content 24 from the respective one or more signals 14 and one or more portions of user-defined criterion 44, such as text. Alternatively, radio player module 26 may include default data in place of any user-defined criterion 44. In any case, when radio player module 26 has mode setting 48 equal to idle mode, one or any combination of user-defined criterion 44 may be utilized as a filter to be applied to broadcast radio signal 14 and/or supplemental content 24, thereby limiting generation of alert signal 36 and/or non-visual notification 40.

Additionally, in this aspect, radio player module 26 may initiate generation of alert signal 36, or another separate signal, additionally including message data 49 corresponding to match reporting message 50. In particular, message data 49 includes information about the determined idle mode match of received content with user-defined criterion, which can be reported to the user via match reporting message 50. For example, match reporting message 50 may include, but is not limited to, a visual or audible message generated by user interface 32 and identifying the match. Further, match reporting message 50 may further comprise an interactive portion 51 operable to receive user input as to whether or not to change mode setting 48 to interactive or on mode, thereby allowing output of representations of primary content 22 and supplemental content 24.

Thus, in the above-described aspects of FIGS. 1 and 2, communication device 12 includes detector 34 that identifies receipt of supplemental content 24 from broadcast radio transmission 14, initiating generating of alert signal 36 operable to activate alerting device 38 to output non-visual notification 40 to catch the attention of user so as to allow viewing of a representation of supplemental content 24 on a display. Further, communication device 12 may include comparator 46 operable to provide user control over the generation of alert signal 36 and/or the outputting of non-visual notification 40 based on one or more user-defined criterion 44. Additionally, the use of comparator 46 may be based on mode setting 48 of radio player module 26, such as when mode setting 48 is in idle mode. It should be noted that the above-described aspects may be utilized individually or in any combination to provide communication device 12 with an alerting capability based on supplemental content 24. Thus, the described system enables a user to be notified when supplemental content 24 is received, and to control the receipt and notification functionality according to user-defined criterion 44.

Figure 3:
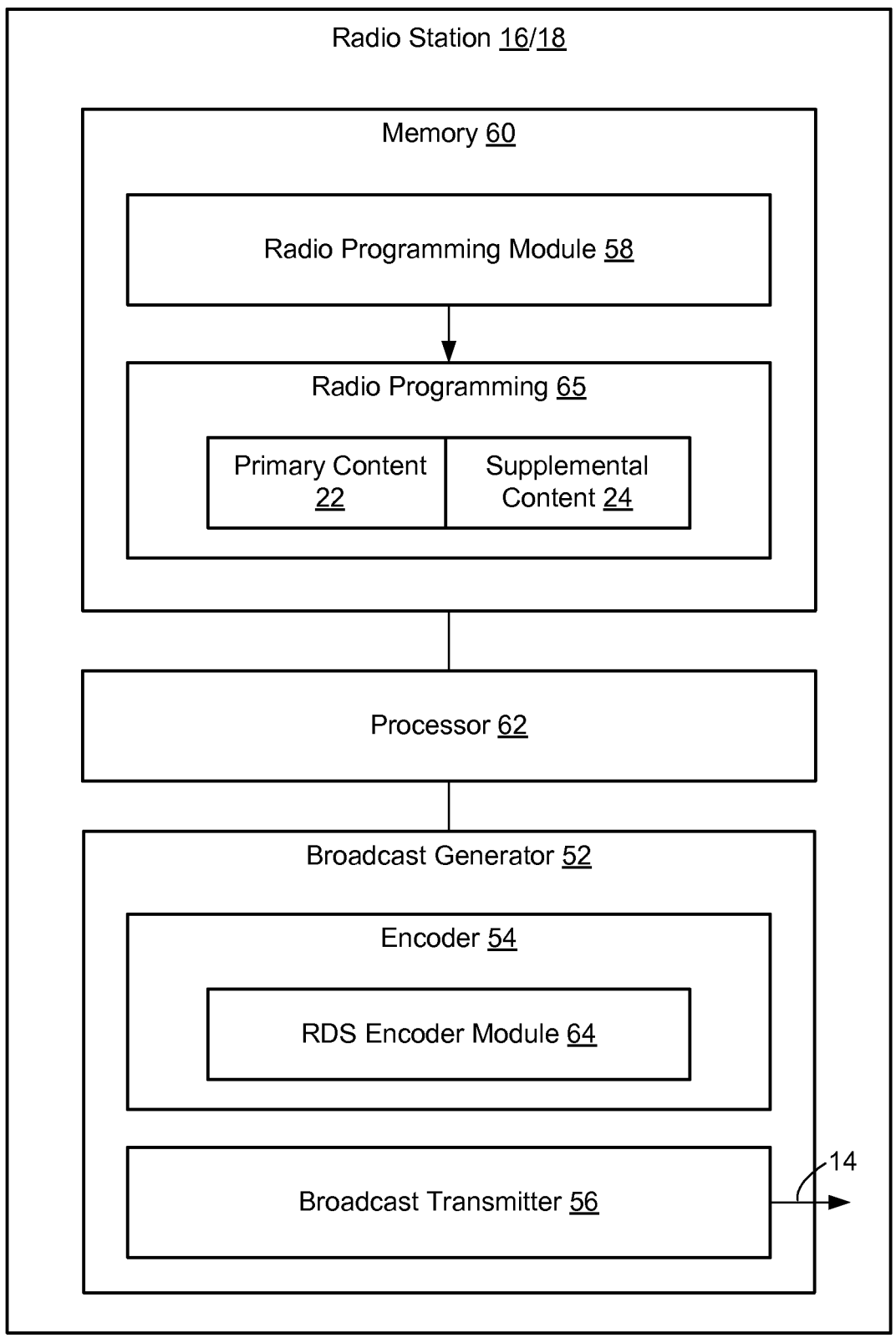
FIG. 3 is a schematic diagram of an aspect of a radio station of the system of FIG. 1.

Referring to FIGS. 1 and 3, broadcast radio network 16 may include any publicly or privately owned broadcast radio station that provides radio programming, such as a frequency modulation (FM) and/or amplitude modulation (AM) radio station and/or a satellite radio station. For example, broadcast radio transmission 14 includes modulated radio carrier signals that carry information representative of primary content 22, such as music, on a first carrier frequency. Further, transmission 14 may additionally include a modulated radio subcarrier signal that carries supplemental information 24 corresponding to the main carrier signal on a second carrier frequency different from the first carrier frequency.

For example, in an aspect of an FM band RDS system operating in the United States having channels in the range of about 87.5 MHz to about 108.0 MHz, the carrier frequency for primary content 22 may be between about 23 kHz and 53 kHz for stereophonic audio, and at 15 kHz or less for monophonic audio, while the carrier frequency for supplemental content 24 may be at about 57 kHz and allows 1187.5 bits/second data rate. Further, for example, in an AM band RDS system operating in the United States having channels in the range of about 520 kHz to about 1710 kHz, supplemental content 24 may be carried by subcarrier frequencies outside of the (human) audible range, e.g. between about 20 Hz and about 10 kHz, such as in a sub-audible frequency range. Additionally, for example, a satellite band RDS system may have channels in the in the gigahertz (GHz) range. For example, in North America, satellite radio is broadcast using the 2.3 GHz S band, while in other parts of the world satellite radio is broadcast using the 1.4 GHz L band. Further, in a satellite band RDS system, supplemental content 24 may be referred to as program associated data (PAD).

As such, referring specifically to FIG. 3, radio stations 18 and 20 include a broadcast generator 52 having one or more encoders 54 to encode primary content 22 and supplemental content 24, and one or more transmitters 56 to broadcast the content on respective carrier waves to receivers. Each radio station 18 and 20 may comprise any hardware, software, firmware, modules, data and instructions for obtaining primary content 22 and supplemental content 24, and generating broadcast radio transmission 14. For example, in one aspect, radio stations 18 and 20 may comprise a radio programming module 58 stored in a memory 60 and executable by a processor 62 to obtain primary content 22 and secondary content 24, and to generate radio programming 65 for transmission by broadcast generator 52 as broadcast radio transmission 14. In this aspect, radio programming 65 includes the primary audio or radio program represented by primary content 22 and the associated, enhanced information, such as RDS data, represented by supplemental content 24.

For example, in an RDS system, supplemental content 24 may include any RDS data, including but not limited to any one or any combination of: alternate frequency (AF) data, clock date and time (CT) data, enhanced other networks (EON) data, program identification (PI) data, program item number (PIN) data, extended country code (ECC) data, program service (PS) data, scrolling program service (SPS) data, program type (PTY) data, program type name (PTYN) data, regional links (REG) data, radio text (RT) or radio text plus (RTplus) data, travel announcements (TA) data, travel program (TP) data, traffic message channel (TMC) data, music/speech switch (M/S) data, transparent data channel (TDC) data, radio paging (RP) data, in house application (IH) data, emergency warning system (EWS) data, and data from free format groups, such as Open Data Applications (ODA).

As such, in an RDS system, encoder 54 includes an RDS encoder module 64 having any one or any combination of hardware, software, firmware, instructions, or algorithms operable to encode supplemental content 24 according to RDS specifications. For example, according to the RDS specifications, the RDS data is formatted in groups, and there are 16 groups divided into A and B types. These groups contain different data, such as the different types of supplemental information 22 listed above, e.g. PI, PS, PTY, PTYN, and RT. An RDS encoder at broadcast radio station 16 and/or 18 may broadcast various combinations of the groups in a group sequence.

A group is formatted as 104 bits, and each group is divided into 4 blocks. A block contains 26 bits, and is divided into an Information Word and a Check Word+Offset Word. The Information Word contains 16 bits and carries data, while the Check Word+Offset Word contain 10 bits and is for error correction and synchronization.

Additionally, for each group: block 1 contains the PI code of the radio station; block 2 contains a Group Type Code that identifies the present transmitted group, a Version Flag that identifies the group as Type A or Type B, a TP flag, the PTY, and 5 individual bits; and blocks 3 and 4 contain group specific data. It should be noted that in B groups, the PI code is repeated in block 3 for better synchronization.

Further, a special type of group is called an Open Data Applications (ODA). ODA groups allow the creation of a huge number of specific applications based on RDS. To use an ODA application, a broadcaster sends a 3A group having a 16 bit code of an Application Identification (AID) to identify the ODA. Further, the 3A group includes 5 bits for reporting the groups that are going to be used with the ODA, and 16 bits that can be used for sending application-related information. For example, light applications can be embedded into the last 16 bits of the 3A group. Otherwise, the mentioned 5 bit portion specifies the other groups that are to be used for sending information, where the other groups may include: 3B, 4B, 5B, 6B, 7B, 8B, 9B, 10B, 11A, 11B, 12A, 12B and 13B. Suitably equipped target receivers can recognize the AID code and decode it in order to launch the application and access ODA information. The AID code is formally requested from the NAB (National Broadcasters Association) in North America, and the EBU (European Broadcasters Union) in Europe to insure the required coordination and interoperability among RDS enabled receivers.

Figure 4:
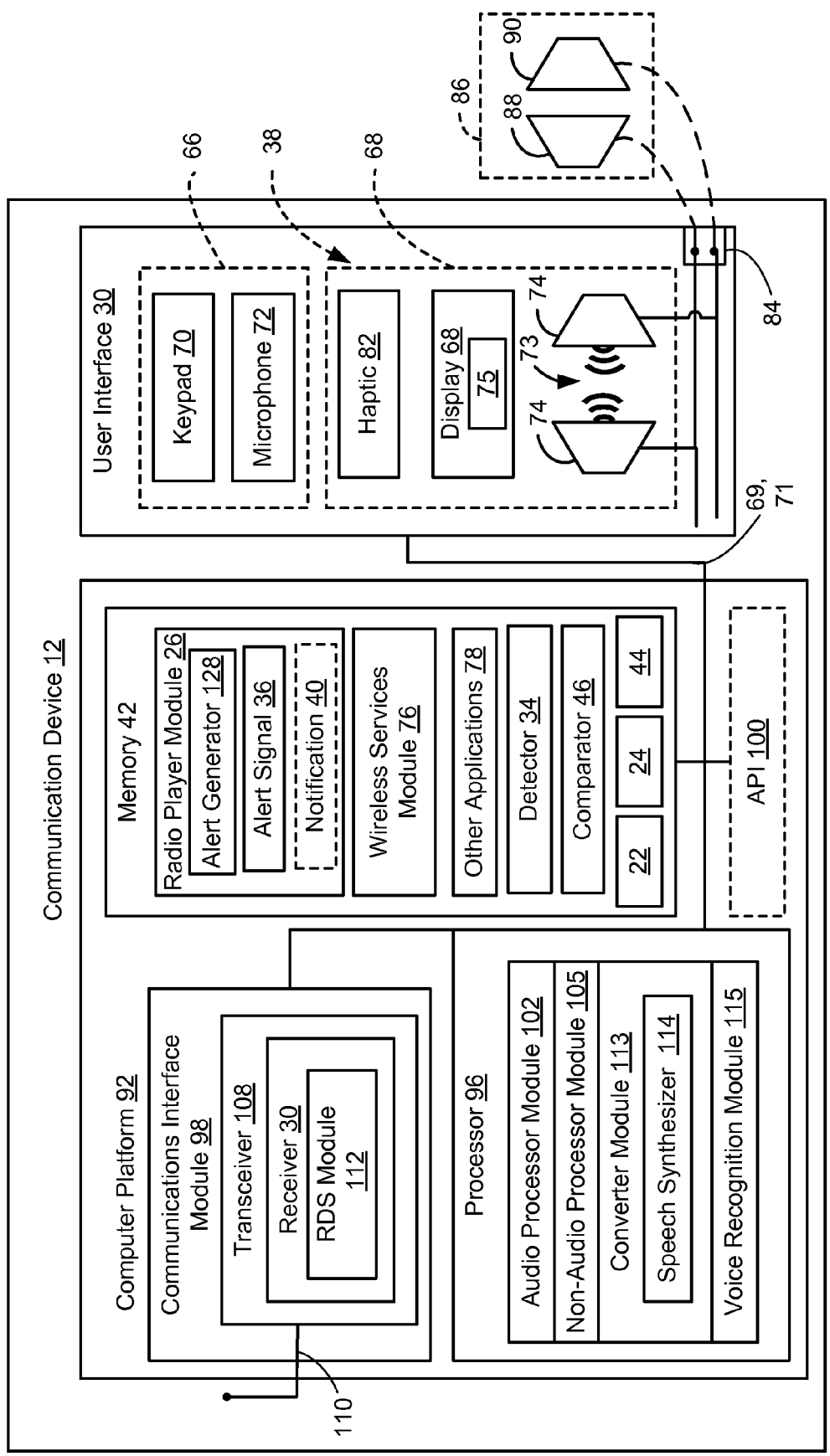
FIG. 4 is a schematic diagram of an aspect of the communication device of FIGS. 1 and 2.
Figure 5:
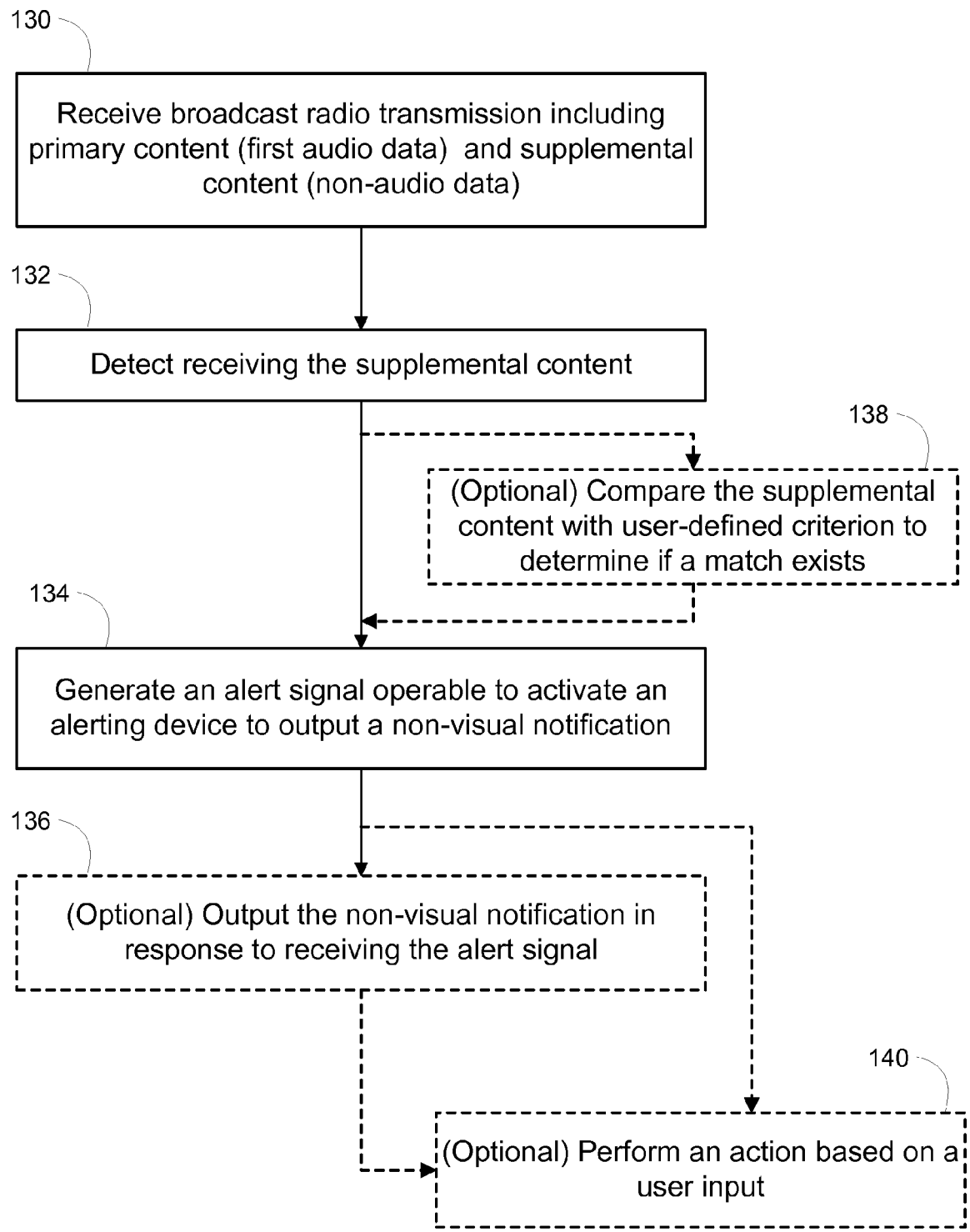
FIG. 5 is a flowchart of one aspect of a method of enhancing radio programming.

Referring back to FIGS. 1 and 2, and additionally to FIG. 4, communication device 12 is configured to receive and decode broadcast radio transmission 14, initiate generation of alert signal 36 and/or non-visual notification 40, and further to output representations of primary content 22 and supplemental content 24 on user interface 32.

More specifically, although communication device 12 is illustrated as a cellular telephone, it should be understood that communication device 12 may include any computerized device capable of receiving broadcast signals. Thus, system 10 may include one or more wired or wireless communication devices 12, which may include a cellular telephone, a Personal Digital Assistant (PDA), a satellite telephone, a palm computer, a Personal Communication Services (PCS) device, a portable gaming or music device, etc.

Further, user interface 32 of communication device 12 includes at least one input device 66 for generating inputs into communication device 12, and at least one output device 68 for generating information for consumption by user 15 of the communication device 12. For example, input device 66 may include one or any combination of mechanisms such as a key, keypad and/or keyboard 70, a mouse, a touch-screen display, a microphone 72, etc. In certain aspects, an input device 66 provides for user input to interact with an application, program or module, such as radio player module 26, a wireless services module 76 and other applications 78, discussed below. Further, for example, output device 68 may include but is not limited to one or any combination of audio speaker 74, display 80, a haptic feedback mechanism 82 such as a vibrator, etc. Additionally, user interface 32 may include one or more output ports 84, for example, to which one or more remote output devices 86, such as speakers or earphones 88 and 90, may be connected. For example, output ports 84 may include a mechanical connector, infrared transmitter/receiver, BLUETOOTH transmitter/receiver, IEEE 802.11x transmitter/receiver, etc. In particular, one or any combination of the above-noted output device 68 may define alerting device 38 (FIGS. 1-2).

Additionally, one or more output devices 68 may include circuitry operable to receive output signals 69 and 71 corresponding to primary content 22 and supplemental content 24, and to transform those signals respectively into a generated output 73 and 75 respectively representing primary content 22 and supplemental content 24. For example, in one non-limiting aspect, generated output 73 corresponding to primary content 24 may include audible sound generated by speaker 74, while generated output 75 corresponding to supplemental content 24 may include text, image, or graphics generated by display 80. It should be noted, however, that generated output 75 corresponding to supplemental content 24 may include one or any combination of an audible sound such as from speaker 74, a vibration such as from haptic feedback mechanism 82, and text, image, or graphics generated by display 80, any one or any combination of which may be further combined with generated output 73 corresponding to primary content 24.

Further, user interface 32 may be part of or may be connected to a computer platform 92 that includes a memory 42 having one or more modules, programs, or applications executable by a processor 96 and interacting with user interface 32 and a communications interface module 98.

Processor 96 controls the operation of communications device 12, for example, in cooperation with applications, programs, modules stored in memory 42. The control functions may be implemented, for example, in a single microprocessor, or in multiple microprocessors. Suitable microprocessors may include general purpose and special purpose microprocessors, as well as digital signal processors. Further, for example, processor 96 may be an application-specific integrated circuit (ASIC), or other chipset, logic circuit, or other data processing device. In some aspects, processor 96 or other data processing device such as ASIC may execute an application programming interface (API) layer 100 that interfaces with any resident applications, programs, or modules stored in memory 42. For example, API 100 may be a runtime environment executing on communication device 12. One such runtime environment is Binary Runtime Environment for Wireless® (BREW®) software developed by Qualcomm Incorporated of San Diego, Calif. Other runtime environments may be utilized that, for example, operate to control the execution of applications, programs, modules on a computing device.

Additionally, processor 96 may interface with or include one or more audio processor modules 102, which provide output signals 69 and 71 to one or more speakers 74, and which receives audio inputs from microphone 72. For example, audio processor module 102, which may cooperate with receiver 30 and/or radio player module 26, may include one or any combination of hardware, software, firmware, instructions, or algorithms operable to process primary content 22 and supplemental content 24 to generate signals 69 and 71. It should be noted that primary content 22 and audio data of supplemental content 24 may be in either the same or in different audio formats, which can be recognized by audio processor module 102 and used to forward and/or generate audio signals appropriate for a given output device, such as one or more speakers 74. Additionally, processor 96 may include a non-audio processor module 105, which may cooperate with receiver 30 and/or radio player module 26, may include one or any combination of hardware, software, firmware, instructions, or algorithms operable to process non-audio, e.g. text, video, graphics, etc., forms of supplemental content 24 to generate output signal 71 for receipt by one or more output devices 68, such as display 80 or haptic feedback mechanism 82.

Further, processor 96 may include or interface with a converter module 113 having a speech synthesizer 114, operable to change supplemental content 24 from text data to speech data, such as for use in generating an audible form of non-visual notification message 40. For example, converter module 113 and/or speech synthesizer 114 include hardware, software, and/or algorithms operable to generate an audio signal representing human speech created by concatenating pieces of recorded speech that are stored in a database, such as in memory 42, and/or by implementing a model of the vocal tract and other human voice characteristics to create a completely "synthetic" voice output. For example, converter module 113 enables text-based supplemental content 24 to be output on communication device 12 as speech.

Memory 42 represents any type of memory associated with communications device 12. For example, memory 42 includes one or any combination of random access memory (RAM) and read-only memory (ROM), erasable ROM (EPROM), electronically erasable ROM (EEPROM), flash cards, or any memory common to computer platforms. Further, memory 42 may include one or more flash memory cells, or may be any secondary or tertiary storage device, such as magnetic media, optical media, tape, or soft or hard disk. For example, computer program instructions, codes and/or data utilized in the operation of communications device 12 may be stored in non-volatile memory, such as EPROM, EEPROM, and/or flash memory. Additionally, memory 42 may be implemented as discrete devices, stacked devices, or may be integrated with processor 96. Memory 42 may also include areas partitioned into and designated for use as temporary memory buffers, which may store data for rendering to user interface 32 and/or for use with any resident applications, programs, or modules stored in or executed from memory 42. Further, memory 42 may store radio player module 26 and the received or generated contents, such as primary content 22, supplemental content 24, which are used by processor 96 in operating communication device 12. Also, for example, memory 42 may store data corresponding to alert signal 36 and/or non-visual notification 40 to enable a user to cache and later recall, play or download the information corresponding to a given notification.

Additionally, communications interface module 98 enables receipt of broadcast radio transmission 14, and in some aspects further allows for transmission and receipt of wireless communication messages 103 (FIG. 1) with a wireless communication network 104 (FIG. 1) or with other wireless devices 106 (FIG. 1) or with remote alerting device 38 (FIGS. 1 and 2). For example, in one aspect, communications interface module 98 includes one or more transceivers 108, e.g. transmitter and receiver components, coupled to one or more antennas 110 for transmitting and receiving short-range radio signals, for example to and from nearby devices, and/or long-range radio signals, for example to and from one or more base stations in a wireless communications network 104. Transceiver 108 may operate according to any known standard, including CDMA, cdmaOne, cdma2000, UMTS, Wideband CDMA, Global System for Mobile Communications (GSM), TIA/EIA-136, BLUETOOTH, UMB, WiMax, Wi-Fi, IEEE 802.11x, etc. Additionally, it should be noted that output ports 84 may be part of or may interconnect with communications interface module 98.

Receiver 36 may be included within transceiver 108, and receives and demodulates radio broadcast signal 14 transmitted by broadcast radio network 16. For example, receiver 36 may be configured to filter and demodulate RDS-based FM, AM or satellite radio broadcasts for output to the user via one or more output devices 68. As such, in one aspect, receiver 36 may include an RDS decoder module 112 having any one or any combination of hardware, software, firmware, instructions, or algorithms operable according to RDS system standards to parse primary content 22 and supplemental content 24, and to decode the supplemental content.

As noted above, communication device 12 further includes radio player module 26, which may be stored in memory 42. Radio player module 26 provides interactivity with user to control reception of and interaction with broadcast radio transmission 14. For example, radio player module 26 may include one or any combination of hardware, software, firmware, instructions, or algorithms operable to generate one or more interactive user interfaces 120 on one or more output devices 68 that allow a user to tune to radio stations, save favorite stations, adjust volume, save supplemental content 24 to memory 42 for later recall, define one or more user-defined criterion 44, define conditions for initiating generation of alert signal 36 or non-visual notification message 40 or match reporting message 50, change idle setting 48, and to perform any other interactions described herein or involved with listening to a radio broadcast of primary content 22 and experiencing supplemental content 24.

For example, one or more interactive user interfaces 120 may include, but are not limited to, one or any combination of graphical user interfaces presented on display 80, audible user interfaces generated by speech synthesizer 114 and output by speaker 74, and user activated response inputs such as keys on keyboard 70, virtual keys generated on display 80, and voice recognition responses received via microphone 72 and processed by a voice recognition module 115 within processor 96.

Additionally, detector 34 may include one or any combination of hardware, software, firmware, instructions, or detector algorithms operable to communicate with receiver 30, monitor for any received signals 14, identify if any received signals 14 include supplemental content 24, and generate a detected signal 124 (FIG. 2) indicating that supplemental content 24 is detected.

Further, in some aspects, as noted above, communication device 12 includes comparator 46, which is in communication with one or any combination of detector 34, receiver 30 and memory 42, such as to obtain or access one or more user-defined criterion 44. Comparator 46 may include one or any combination of hardware, software, firmware, instructions, or comparison algorithms operable to examine at least a portion of detected supplemental content 24 in response to detected signal 124 (FIG. 2), access or obtain user-defined criterion 44, determine whether a match exists between at least a portion of detected supplemental content 24 and at least a portion of one or more user-defined criterion 44, and generate a correspondence signal 126 (FIG. 6) indicating that at least some degree of matching exists. In some aspects, for example, comparator 46 may include an algorithm operable to compare text data to determine matches between a letter, symbol, number, word, phrase, etc. Further, in some aspects, comparator 46 may include an algorithm incorporating a form of pattern matching to verify whether the detected supplemental content 24 truly corresponds to a form of primary content 22, e.g. a song, an artist, a news item, a stock quote, etc., in which user is interested based on one or a combination of user-defined criterion 44. Thus, a determination of a match by comparator 46 triggers generation of correspondence signal 126, which then triggers generation of alert signal 36 and/or notification 40.

Additionally, in some aspects, radio player module 26 may additionally include an alert generator 128 in communication with detector 34 and, in some aspects, comparator 46. Alert generator 128 may include one or any combination of hardware, software, firmware, instructions, or alert signaling algorithms operable to receive detected signal 124 (FIG. 2) and/or correspondence signal 126 (FIG. 2), and in response thereto, generate alert signal 36 for transmission to alerting device 38.

In other aspects, computer device 12 may execute wireless services module 76 to exchange messages 103 with wireless communication network 104 and/or other devices 106, and to access information on other networks 116, such as the Internet. For example, wireless services module 130 may include one or any combination of hardware, software, firmware, instructions, or algorithms operable to provide communication device 12 with one or any combination of services such as a voice call application, a data call application, a messaging application, a group call application, a multimedia (music and/or video) application, a personal information manager, etc.

Additionally, in other aspects, computer device 12 may execute other applications 78 operable to provide any other functionality to communication device 12, such as calendar applications, calculators, business or computing applications, and any other functionality operable on a computerized device.

In operation, communication device 12 may be utilized to alert a user of receipt of supplemental content 24 in broadcast communication 14, and further allows the user to manage and control such alerts based on user-defined criterion 44.

In one aspect, a method of generating an alert includes receiving a broadcast radio transmission at a communication device (Block 130). For example, the broadcast radio transmission includes primary content and supplemental content having a relationship to the primary content. Further, the primary content includes a first audio data, such as music, and the supplemental content includes a non-audio data, such as text.

In another aspect, the act of receiving may include receiving the primary content on a first frequency and receiving the supplemental content on a second frequency different from the first frequency, such as with a radio broadcast signal transmitted according to RDS standards.

In yet another aspect, the act of receiving may include receiving a radio program signal carried on a first amplitude modulated radio wave having a first carrier frequency, and receiving radio data system information carried on a second amplitude modulated radio wave having a second carrier frequency different from the first carrier frequency, wherein the second carrier frequency is outside of an audible frequency range.

Further, the method may include detecting the receiving of the supplemental content (Block 132). For example, the detecting identifies when a receiver component receives the supplemental content in a radio broadcast signal.

Additionally, the method may include generating an alert signal operable to activate an alerting device to output a non-visual notification (Block 134). Further, for example, the generating may include or initiate transmitting of the alert signal to a local alerting device, such as an output device on the communication device. Alternatively, for example, the generating may include or initiate transmitting of the alert signal to a remotely located alerting device, such as a device in a user's personal area network, via a wired or wireless link. Further, for example, the generating may include or initiate transmitting of the alert signal to another communication device.

Moreover, in some aspects, the act of generating may further include adding a message relating to the supplemental content to the alert signal. Additionally, the act of generating may also include adding at least portion of the supplemental content, or a representation thereof, to the alert signal.

In some optional aspects, the method may further include outputting the non-visual notification at the alerting device in response to receiving the alert signal, for example, to attempt to alert a user to the presence of supplemental content (Block 136). For example, the act of outputting may include outputting a first audible sound representing the received primary content, wherein outputting the non-visual notification further includes injecting a second audible sound into the outputting of the first audible sound. For example, the second audible sound is distinguishable from the first audible sound to thereby alert the user of the presence of supplemental content.

In some aspects, the act of outputting may include converting the non-audio data of the supplemental content into second audio data, and outputting a first audible sound representing the received primary content according to the first audio data, while the outputting of the non-visual notification further includes injecting a second audible sound into the outputting of the first audible sound, wherein the second audible sound represents the supplemental content according to the second audio data.

Further, in some aspects, the converting of the non-audio data into second audio data may further include converting text to speech.

In yet other aspects, the act of outputting may include outputting a first audible sound representing the received primary content, wherein outputting the non-visual notification further comprises activating a haptic feedback mechanism.

Optionally, the method may include comparing at least a portion of the supplemental content with at least a portion of one or more user-defined criterion to determine if a match exists (Block 138). In this aspect, the act of generating the alert signal (Block 134) is responsive to the comparing act identifying existence of the match. Further, for example, the act of comparing may include comparing at least a portion of text comprising the supplemental content with at least a portion of user-defined text.

Additionally, in some aspects, the act of comparing may only be performed if a mode setting comprises an idle mode. More specifically, for example, in some aspects, the act of comparing may be based on activating, prior to the receiving of the radio broadcast signal, an idle mode operable to inactivate an outputting on the communication device of any received primary content and any received supplemental content. Specifically, the activating of the idle mode may include disabling a displaying of a representation of the supplemental content and disabling an outputting of an audible sound representing the primary content.

Further, in some aspects, the act of comparing includes comparing at least a portion of text comprising the supplemental content to at least a portion of user-defined text.

In a further optional act, the method may also include performing an action based on a user input (Block 140). For example, the action may include tuning to a user-defined frequency of a radio station in response to activating the idle mode. In another example, this aspect of the method may include receiving, after generating the alert signal, a user input identifying a mode change, changing from the idle mode to an interactive mode in response to the user input; and outputting the received primary content and the received supplemental content on the communication device.

Thus, the described system enables a user to be notified when supplemental content is received by a communication device, and to control the receipt and notification functionality according to user-defined criterion.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of generating an alert, comprising:
   receiving a broadcast radio transmission at a communication device, wherein the broadcast radio transmission comprises primary content and supplemental content having a relationship to the primary content, wherein the relationship is defined prior to the transmission of the broadcast radio transmission, wherein the primary content comprises a first audio data, wherein the supplemental content comprises a non-audio data;
   detecting the receiving of the supplemental content; and
   generating, by the communication device, an alert signal operable to activate an alerting device to output a non-visual notification in response to the detection of the supplemental content.

2. The method of claim 1, further comprising outputting the non-visual notification at the alerting device in response to receiving the alert signal.

3. The method of claim 2, further comprising outputting a first audible sound representing the received primary content, and wherein outputting the non-visual notification further comprises injecting a second audible sound into the outputting of the first audible sound, wherein the second audible sound is distinguishable from the first audible sound.

4. The method of claim 2, further comprising:
   converting the non-audio data of the supplemental content into second audio data;
   outputting a first audible sound representing the received primary content according to the first audio data; and
   wherein outputting the non-visual notification further comprises injecting a second audible sound into the outputting of the first audible sound, wherein the second audible sound represents the supplemental content according to the second audio data.

5. The method of claim 4, wherein converting the non-audio data of the supplemental content into second audio data further comprise converting text to speech.

6. The method of claim 2, further comprising outputting a first audible sound representing the received primary content, and wherein outputting the non-visual notification further comprises activating a haptic feedback mechanism.

7. The method of claim 1, further comprising transmitting the alert signal to the alerting device.

8. The method of claim 7, wherein transmitting the alert signal to the alerting device further comprises wirelessly transmitting to another communication device.

9. The method of claim 7, wherein the alerting device is located within a user interface of the communication device, and wherein transmitting the alert signal to the alerting device further comprises transmitting the alerting signal to the user interface of the communication device to prompt the user interface to output a non-visual notification.

10. The method of claim 1, further comprising:
    comparing at least a portion of the supplemental content with at least a portion of one or more user-defined criterion to determine if a match exists; and
    wherein generating the alert signal is responsive to the comparing identifying existence of the match.

11. The method of claim 10, wherein comparing at least a portion of the supplemental content with at least a portion of one or more user-defined criterion further comprises comparing at least a portion of text comprising the supplemental content with at least a portion of user-defined text.

12. The method of claim 10, wherein the comparing further comprises comparing only if a mode setting comprises an idle mode.

13. The method of claim 1, wherein receiving the broadcast radio transmission further comprises receiving the primary content on a first frequency and receiving the supplemental content on a second frequency different from the first frequency.

14. The method of claim 1, wherein receiving the broadcast radio transmission further comprises receiving a radio program signal carried on a first amplitude modulated radio wave having a first carrier frequency, and receiving radio data system information carried on a second amplitude modulated radio wave having a second carrier frequency different from the first carrier frequency, wherein the second carrier frequency is outside of an audible frequency range.

15. A method of generating an alert, comprising:
receiving a broadcast radio transmission at a communication device, wherein the broadcast radio transmission comprises primary content and supplemental content having a relationship to the primary content, wherein the relationship is defined prior to the transmission of the broadcast radio transmission, wherein the primary content comprises a first audio data, wherein the supplemental content comprises a non-audio data;
detecting the receiving of the supplemental content;
generating an alert signal operable to activate an alerting device to output a non-visual notification;
activating, prior to the receiving, an idle mode operable to inactivate an outputting on the communication device of any received primary content and any received supplemental content;
comparing, based on the idle mode, at least a portion of the received supplemental content with at least a portion of one or more user-defined criterion to determine if a match exists; and
wherein generating the alert signal is responsive to the comparing identifying existence of the match.

16. The method of claim 15, comparing at least a portion of the received supplemental content to at least a portion of one or more user-defined criterion further comprises comparing at least a portion of text comprising the supplemental content to at least a portion of user-defined text.

17. The method of claim 15, further comprising tuning to a user-defined frequency of a radio station in response to activating the idle mode.

18. The method of claim 15, further comprising disabling a displaying of a representation of the supplemental content and disabling an outputting of an audible sound representing the primary content, both in response to activating the idle mode.

19. The method of claim 15, wherein generating the alert signal further comprises adding a message relating to the supplemental content to the alert signal.

20. The method of claim 15, wherein generating the alert signal further comprises adding a portion of the supplemental content to the alert signal.

21. The method of claim 15, further comprising:
receiving, after generating the alert signal, a user input identifying a mode change;
changing from the idle mode to an interactive mode in response to the user input; and
outputting the received primary content and the received supplemental content on the communication device.

22. A computer program product for generating an alert, comprising:
a computer-readable medium, comprising:
at least one instruction operable to cause a computer to receive a broadcast radio transmission at a communication device, wherein the broadcast radio transmission comprises primary content and supplemental content having a relationship to the primary content, wherein the relationship is defined prior to the transmission of the broadcast radio transmission, wherein the primary content comprises a first audio data, wherein the supplemental content comprises a non-audio data;
at least one instruction operable to cause the computer to detect the receiving of the supplemental content; and
at least one instruction operable to cause the computer to generate, at the communication device, an alert signal operable to activate an alerting device to output a non-visual notification in response to the detection of the supplemental content.

23. The computer program product of claim 22, wherein the computer-readable medium further comprises:
at least one instruction operable to cause the computer to activate, prior to the receiving, an idle mode operable to block an outputting on the communication device of any received primary content and any received supplemental content; and
at least one instruction operable to cause the computer to compare at least a portion of the received supplemental content with at least a portion of one or more user-defined criterion to determine if a match exists;
wherein the at least one instruction operable to cause the computer to generate the alert signal is responsive to the at least one instruction operable to cause the computer to compare identifying existence of the match.

24. At least one processor for generating an alert, comprising:
a first module for receiving a broadcast radio transmission at a communication device, wherein the broadcast radio transmission comprises primary content and supplemental content having a relationship to the primary content, wherein the relationship is defined prior to the transmission of the broadcast radio transmission, wherein the primary content comprises a first audio data, wherein the supplemental content comprises a non-audio data;
a second module for detecting the receiving of the supplemental content; and
a third module for generating, by the communication device, an alert signal operable to activate an alerting device to output a non-visual notification in response to the detection of the supplemental content.

25. The at least one processor of claim 24, further comprising:
a fourth module for activating, prior to the receiving, an idle mode operable to block an outputting on the communication device of any received primary content and any received supplemental content; and
a fifth module for comparing at least a portion of the received supplemental content with at least a portion of one or more user-defined criterion to determine if a match exists;
wherein the third module for generating the alert signal is responsive to the fifth module for comparing identifying existence of the match.

26. A communication device for generating an alert, comprising:
means for receiving a broadcast radio transmission, wherein the broadcast radio transmission comprises primary content and supplemental content having a relationship to the primary content, wherein the relationship is defined prior to the transmission of the broadcast radio transmission, wherein the primary content comprises a first audio data, wherein the supplemental content comprises a non-audio data;

means for detecting the receiving of the supplemental content; and means for generating, by the communication device, an alert signal operable to activate an alerting device to output a non-visual notification in response to the detection of the supplemental content.

27. The communication device of claim 26, further comprising:

means for activating, prior to the receiving, an idle mode operable to block an outputting on the communication device of any received primary content and any received supplemental content; and means for comparing at least a portion of the received supplemental content with at least a portion of one or more user-defined criterion to determine if a match exists;

wherein the means for generating the alert signal is responsive to the means for comparing identifying existence of the match.

28. A communication device for generating an alert, comprising:

a receiver operable to receive a broadcast radio transmission, wherein the broadcast radio transmission comprises primary content and supplemental content having a relationship to the primary content, wherein the relationship is defined prior to the transmission of the broadcast radio transmission, wherein the primary content comprises a first audio data, wherein the supplemental content comprises a non-audio data;

a detector having a detector algorithm operable to detect the receiving of the supplemental content; and a generator having an alert signaling algorithm operable to generate an alert signal operable to activate an alerting device to output a non-visual notification in response to the detection of the supplemental content.

29. The device of claim 28, further comprising at least one output device comprising the alerting device and having a generation algorithm operable to output the non-visual notification in response to receiving the alert signal.

30. The device of claim 29, wherein the at least one output device is further operable to output a first audible sound representing the received primary content, and wherein the at least one output device is further operable to inject a second audible sound into the outputting of the first audible sound, wherein the second audible sound is distinguishable from the first audible sound.

31. The device of claim 29, further comprising:

a converter module operable to convert the non-audio data of the supplemental content into second audio data;

wherein the at least one output device is further operable to output a first audible sound representing the received primary content according to the first audio data; and wherein the at least one output device is further operable to inject a second audible sound into the outputting of the first audible sound, wherein the second audible sound represents the supplemental content according to the second audio data.

32. The device of claim 31, wherein the converter module is further operable to convert text to speech.

33. The device of claim 29, wherein the at least one output device is further operable to output a first audible sound representing the received primary content, and wherein the non-visual notification further comprises a haptic feedback.

34. The device of claim 28, further comprising a transmitter operable to transmit the alert signal to the alerting device.

35. The device of claim 34, wherein the alerting device is located across a wireless communication network.

36. The device of claim 34, wherein the alerting device is located within a user interface of the communication device, and wherein the transmitter is further operable to transmit the alerting signal to the user interface of the communication device to prompt the user interface to output a non-visual notification.

37. The device of claim 28, further comprising:

a comparator module operable to compare at least a portion of the supplemental content with at least a portion of one or more user-defined criterion to determine if a match exists; and wherein the alert signal is generated in responsive to the comparator identifying existence of the match.

38. The device of claim 37, wherein the comparator is further operable to compare at least a portion of text comprising the supplemental content with at least a portion of user-defined text.

39. The device of claim 37, further comprising a mode setting comprising an idle mode or an interactive mode, wherein the comparator is operable to compare only if the mode setting comprises the idle mode.

40. The device of claim 28, wherein the broadcast radio transmission further comprises the primary content on a first frequency and the supplemental content on a second frequency different from the first frequency.

41. The device of claim 28, wherein the broadcast radio transmission further comprises a radio program signal carried on a first amplitude modulated radio wave having a first carrier frequency, and radio data system information carried on a second amplitude modulated radio wave having a second carrier frequency different from the first carrier frequency, wherein the second carrier frequency is outside of an audible frequency range.

42. A communication device for generating an alert, comprising:

a receiver operable to receive a broadcast radio transmission, wherein the broadcast radio transmission comprises primary content and supplemental content having a relationship to the primary content, wherein the relationship is defined prior to the transmission of the broadcast radio transmission, wherein the primary content comprises a first audio data, wherein the supplemental content comprises a non-audio data;

a detector having a detector algorithm operable to detect the receiving of the supplemental content;

a generator having an alert signaling algorithm operable to generate an alert signal operable to activate an alerting device to output a non-visual notification;

a mode setting comprising an idle mode operable to inactivate an outputting on the communication device of any received primary content and any received supplemental content;

a comparator operable to compare, based on the idle mode, at least a portion of the received supplemental content with at least a portion of one or more user-defined criterion to determine if a match exists; and wherein the generator generates the alert signal responsive to the comparator identifying existence of the match.

43. The device of claim 42, wherein the comparator is further operable to compare at least a portion of text comprising the supplemental content to at least a portion of user-defined text.

44. The device of claim 42, further comprising a radio player module operable to tune to a user-defined frequency of a radio station in response to the idle mode.

45. The device of claim 42, further comprising a radio player module, based on the idle mode, operable to disable a displaying of a representation of the supplemental content and to disable an outputting of an audible sound representing the primary content.

46. The device of claim 42, wherein the generator is further operable to add a message relating to the supplemental content to the alert signal.

47. The device of claim 42, wherein the generator is further operable to add a portion of the supplemental content to the alert signal.

48. The device of claim 42, further comprising:
- a user interface operable to receive, after generating the alert signal, a user input identifying a mode change;
- a radio player module operable to change from the idle mode to an interactive mode in response to the user input; and
- at least one output device comprising the alerting device operable to output the received primary content and the received supplemental content on the communication device.

* * * * *